US012641357B2

(12) United States Patent
Yang et al.

(10) Patent No.: US 12,641,357 B2
(45) Date of Patent: May 26, 2026

(54) SPEAKER MESH, SPEAKER MESH ASSEMBLY AND ELECTRONIC DEVICE

(71) Applicants: K-Tronics (Suzhou) Technology Co., Ltd., Suzhou (CN); BOE Technology Group Co., Ltd., Beijing (CN)

(72) Inventors: Guang Yang, Beijing (CN); Xiaojin Li, Beijing (CN); Chao Wu, Beijing (CN); Lili Zhou, Beijing (CN); Wenbo Dong, Beijing (CN)

(73) Assignees: K-Tronics (Suzhou) Tehnology Co., Ltd., Suzhou (CN); BOE Technology Group Co., Ltd., Beijing (CN)

( * ) Notice: Subject to any disclaimer, the term of this patent is extended or adjusted under 35 U.S.C. 154(b) by 136 days.

(21) Appl. No.: 18/691,023

(22) PCT Filed: Apr. 28, 2023

(86) PCT No.: PCT/CN2023/091885
§ 371 (c)(1),
(2) Date: Mar. 11, 2024

(87) PCT Pub. No.: WO2023/231684
PCT Pub. Date: Dec. 7, 2023

(65) Prior Publication Data

US 2024/0381015 A1 Nov. 14, 2024

(30) Foreign Application Priority Data

May 31, 2022 (CN) ........................ 202210615435.1

(51) Int. Cl.
*H04R 1/02* (2006.01)

(52) U.S. Cl.
CPC ............... *H04R 1/023* (2013.01); *H04R 1/02* (2013.01); *H04R 1/025* (2013.01);
(Continued)

(58) Field of Classification Search
CPC .......... H04R 1/02; H04R 1/023; H04R 1/025; H04R 1/026; H04R 2201/02; H04R 2201/029; H04R 2499/11; H04R 2499/15
See application file for complete search history.

(56) References Cited

U.S. PATENT DOCUMENTS 4,281,224 A * 7/1981 Castagna ............ B60R 11/0223 381/86
4,974,698 A * 12/1990 Smith .................... H04R 1/023 181/150
(Continued)

FOREIGN PATENT DOCUMENTS

CN 2854982 Y 1/2007
CN 201039435 Y 3/2008
(Continued)

OTHER PUBLICATIONS

PCT/CN2023/091885 international search report dated Aug. 7, 2023.
(Continued)

*Primary Examiner* — Huyen D Le
(74) *Attorney, Agent, or Firm* — IPro, PLLC

(57) ABSTRACT

The present application discloses a speaker mesh, a speaker mesh assembly and an electronic device, which can realize stable installation of the speaker mesh without spoiling the aesthetic appearance of products. The speaker mesh includes a mesh body, a first sidewall and a second sidewall. The mesh body is provided with a plurality of speaker holes. The first sidewall is connected to an edge of a first side of the mesh body, and an inner surface of the first sidewall is provided with a hidden snap-fit portion. The second sidewall is connected to an edge of a second side of the mesh body, and the second sidewall is provided with a snap member.

14 Claims, 9 Drawing Sheets

(52) U.S. Cl.
CPC .... *H04R 2201/02* (2013.01); *H04R 2201/029* (2013.01); *H04R 2499/11* (2013.01); *H04R 2499/15* (2013.01)

(56) References Cited

U.S. PATENT DOCUMENTS

| | | | | |
|---|---|---|---|---|
| 5,652,413 A * | 7/1997 | Mulera | .................. | H04R 1/023 181/150 |
| 2019/0368244 A1 * | 12/2019 | Wang | ................... | H04R 1/2819 |

FOREIGN PATENT DOCUMENTS

| | | | |
|---|---|---|---|
| CN | 101616346 | A | 12/2009 |
| CN | 202309928 | U | 7/2012 |
| CN | 203675265 | U | 6/2014 |
| CN | 204929157 | U | 12/2015 |
| CN | 208675442 | U | 3/2019 |
| CN | 209002210 | U | 6/2019 |
| CN | 209526772 | U | 10/2019 |
| CN | 211823452 | U | 10/2020 |
| CN | 213342593 | U | 6/2021 |
| CN | 213586142 | U | 6/2021 |
| CN | 216217372 | U | 4/2022 |
| CN | 114866891 | A | 8/2022 |
| JP | S61182398 | A | 8/1986 |

OTHER PUBLICATIONS

PCT/CN2023/091885 Written Opinion dated Aug. 7, 2023.
CN 202210615435.1 first office action dated Jan. 10, 2025.

* cited by examiner

SPEAKER MESH, SPEAKER MESH ASSEMBLY AND ELECTRONIC DEVICE

CROSS-REFERENCE TO RELATED APPLICATIONS

This application is a national stage of international PCT Application No. PCT/CN2023/091885 filed on Apr. 28, 2023, and claims a priority to a Chinese Patent Application with the corresponding application number being 202210615435.1 and the application date being May 31, 2022, the entire contents of which are incorporated herein by reference.

TECHNICAL FIELD

The present application relates to a speaker mesh, a speaker mesh assembly and an electronic device.

BACKGROUND

Most electronic devices have speakers to output sound outward. The speaker is usually disposed inside the electronic device. In order to ensure that the sound emitted by the speaker can be efficiently transmitted to the user, a speaker mesh is usually set as a sound transmission channel. The speaker mesh needs to be firmly fixed to an outer surface of the device through a snap-fitting structure to ensure the quality of the device, while avoiding the impact of the exposed snap-fitting structure on the appearance of the equipment. For the above two requirements, the known installation structure of the speaker mesh is difficult to balance. In addition, miniaturization is a mainstream trend of electronic devices, which further increases the design difficulty of the speaker mesh installation structure.

Therefore, it is necessary to improve the installation structure of the speaker mesh.

SUMMARY

According to a first aspect of embodiments of the present application, there is provided a speaker mesh, and the speaker mesh includes:

- a mesh body provided with a plurality of speaker holes;
- a first sidewall connected to an edge of a first side of the mesh body, where an inner surface of the first sidewall is provided with a hidden snap-fit portion; and
- a second sidewall connected to an edge of a second side of the mesh body, where the second sidewall is provided with a snap member.

In an embodiment, the hidden snap-fit portion includes a snap groove, and the snap groove is formed by recessing the inner surface of the first sidewall.

In an embodiment, the snap groove includes a groove bottom and a plurality of groove sidewalls connected to the groove bottom, and the groove bottom and the plurality of groove sidewalls enclose an accommodating space.

In an embodiment, a portion of the mesh body is used as one of the groove sidewalls of the snap groove;

- the inner surface of the mesh body is provided with a chute, and the chute communicates with the snap groove.

In an embodiment, at least one of the sliding groove sidewalls is provided with an inclined guiding surface.

In an embodiment, the first sidewall and the second sidewall are opposite to each other, the snap member is a bendable elastic member, the snap member has a connecting end and a free end, the connecting end is connected to a side of the second sidewall away from the mesh body, and the free end is rotatable relative to the connecting end.

In an embodiment, there are two or more snap members.

In an embodiment, the speaker mesh further includes:

- a third sidewall connected to an edge of a third side of the mesh body, where the third sidewall connects the first sidewall and the second sidewall; and
- a fourth sidewall connected to an edge of a fourth side of the mesh body, where the fourth sidewall connects the first sidewall and the second sidewall, where the fourth sidewall, the first sidewall, the third sidewall and the second sidewall are connected end to end, and jointly form an installation space with the mesh body.

In an embodiment, the mesh body has a flat shape, and the plurality of speaker holes are uniformly distributed in the mesh body and penetrate through the inner surface and an outer surface of the mesh body;

The speaker mesh is an integrally connected metal structure.

According to a second aspect of embodiments of the present application, there is provided a speaker mesh assembly, and the speaker mesh assembly includes:

- a speaker mesh, including a mesh body, a first sidewall and a second sidewall, where the mesh body is provided with a plurality of speaker holes, the first sidewall is connected to an edge of a first side of the mesh body, an inner surface of the first sidewall is provided with a hidden snap-fit portion, the second sidewall is connected to an edge of a second side of the mesh body, and the second sidewall is provided with a snap member; and
- an installation frame, including a frame body, where the frame body is provided with a first matching portion snapped with the hidden snap-fit portion and a second matching portion mated with the snap member.

In an embodiment, the hidden snap-fit portion includes a snap groove formed by recessing the inner surface of the first sidewall;

In an embodiment, the first matching portion includes a protrusion block snapped with the snap groove.

In an embodiment, the snap groove includes a groove bottom and a plurality of groove sidewalls connected to the groove bottom, and the groove bottom and the plurality of groove sidewalls enclose an accommodating space for accommodating the protrusion block.

In an embodiment, a portion of the mesh body is used as one of the plurality of groove sidewalls of the snap groove;

- the inner surface of the mesh body is provided with a chute, and the chute communicates with the snap groove.

In an embodiment, at least one of the plurality of groove sidewalls is provided with an inclined guiding surface;

- and/or, a guiding slope is provided at an edge of the protrusion block.

In an embodiment, the first sidewall and the second sidewall are opposite to each other, the snap member is a bendable elastic member, the snap member has a connecting end and a free end, the connecting end is connected to a side of the second sidewall away from the mesh body, and the free end is rotatable relative to the connecting end;

The frame body is provided with an installation surface for supporting the mesh body, a back surface opposite to the installation surface and away from the mesh body, and a side surface for connecting the installation surface and the back surface, the free end of the snap member is abutted against the back surface, and the back surface serves as the second matching portion mated with the snap member.

In an embodiment, the speaker mesh assembly further includes a dust cover and/or a colloid between the mesh body and the frame body.

According to a third aspect of embodiments of this application, an electronic device is provided, where the electronic device includes the speaker mesh described above or the speaker mesh assembly described above.

DETAILED DESCRIPTION

Exemplary embodiments will be described in detail herein, examples of which are illustrated in the accompanying drawings. When the following description involves the drawings, unless otherwise indicated, like numerals in different drawings represent the same or similar elements. The embodiments described in the following exemplary embodiments do not represent all embodiments consistent with the present application. On the contrary, they are merely examples of devices/methods consistent with some aspects of the present application as detailed in the appended claims.

The terms used in the present application are for the purpose of describing particular embodiments only and are not intended to limit the present application. Unless otherwise defined, technical terms or scientific terms used in the present application should have a general meaning understood by those skilled in the art to which the present application belongs. Similar words such as "a" or "an" used in the specification and claims of the present application do not mean a quantity limitation, but mean that there is at least one. Words such as "include" or "comprise" refer to components or objects that appear before "include" or "comprise", including those listed after "include" or "comprise" and their equivalents, but do not exclude other components or objects. "A plurality of" includes two or more. The terms "connect/couple" or "communicate" and the like are not limited to physical or mechanical connections, and may include electrical connections, whether direct or indirect. As used in this specification and the appended claims, the singular forms "a," "the," and "said" are also intended to include plural forms unless the context clearly indicates other meanings. It should also be understood that the term "and/or" as used herein refers to and includes any or all possible combinations of one or more associated listed items.

Figure 1:
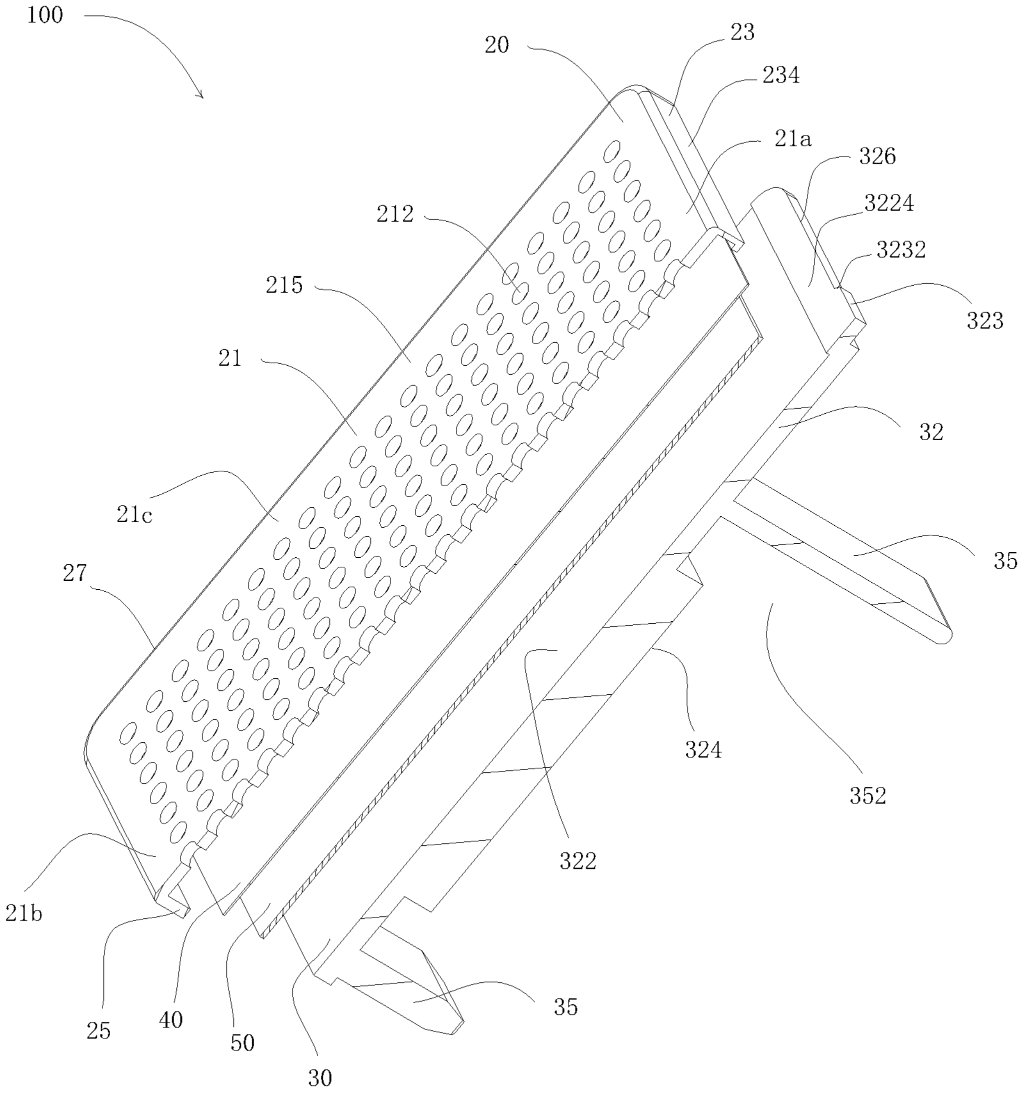
FIG. 1 is a three-dimensional exploded view of a speaker mesh assembly according to an embodiment of the present application.
Figure 2:
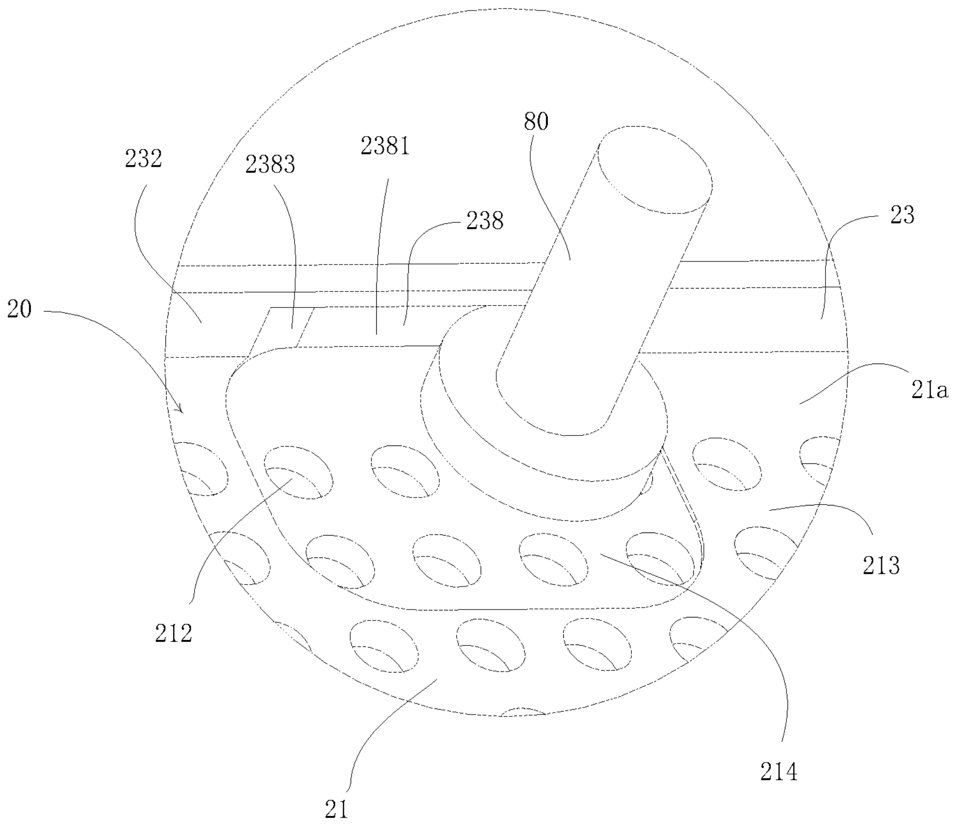
FIG. 2 is a three-dimensional view of the speaker mesh in FIG. 1.
Figure 3:
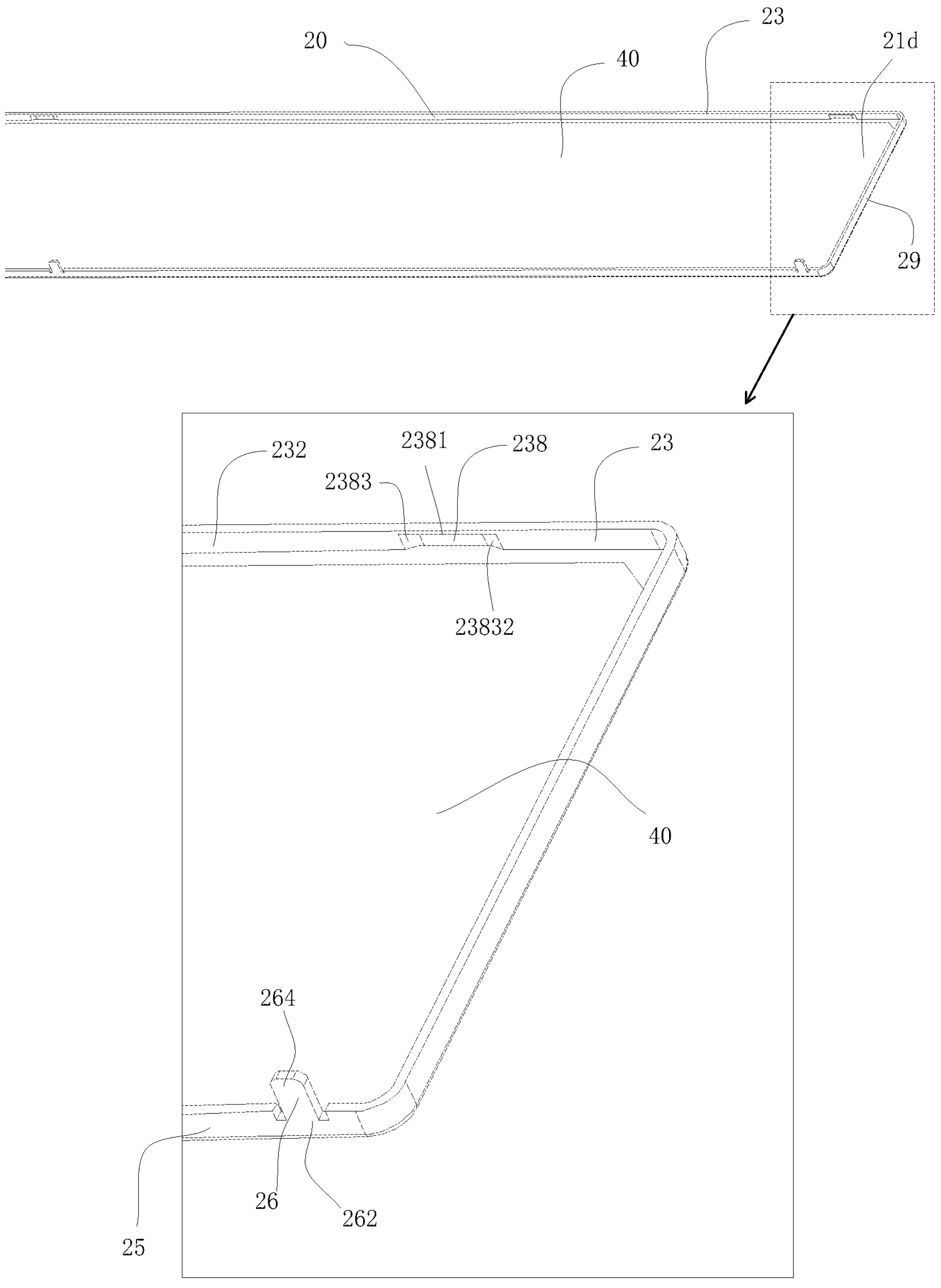
FIG. 3 is a three-dimensional view of the speaker mesh and the dust cover in FIG. 1 after being assembled.
Figure 4:
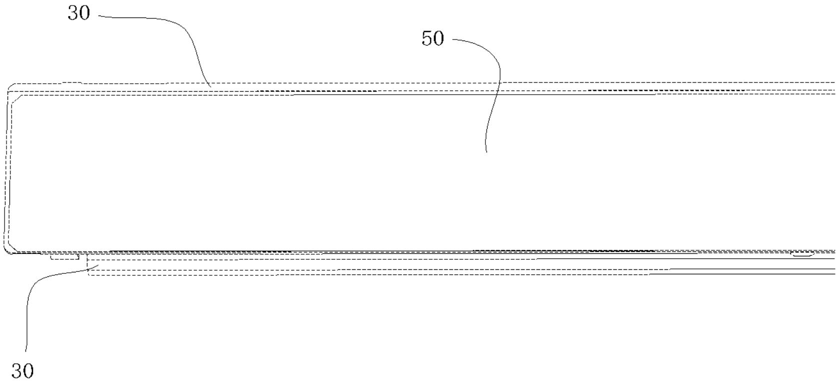
FIG. 4 is a schematic plan view of a double-sided adhesive and an installation frame in FIG. 1 after being assembled.
Figure 5:
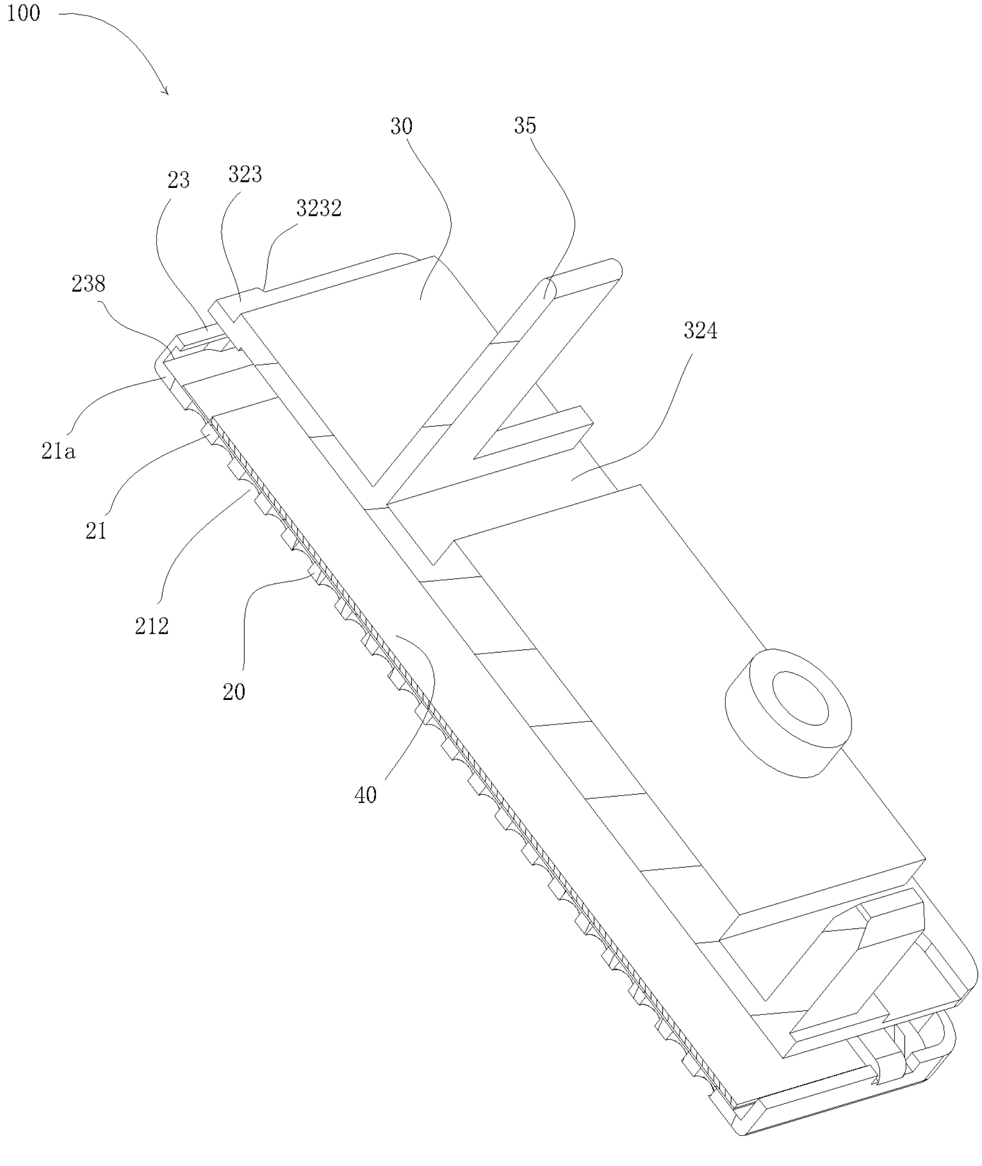
FIG. 5 to FIG. 7 are schematic diagrams of an assembly process of the speaker mesh and the installation frame in FIG. 1.
Figure 6:
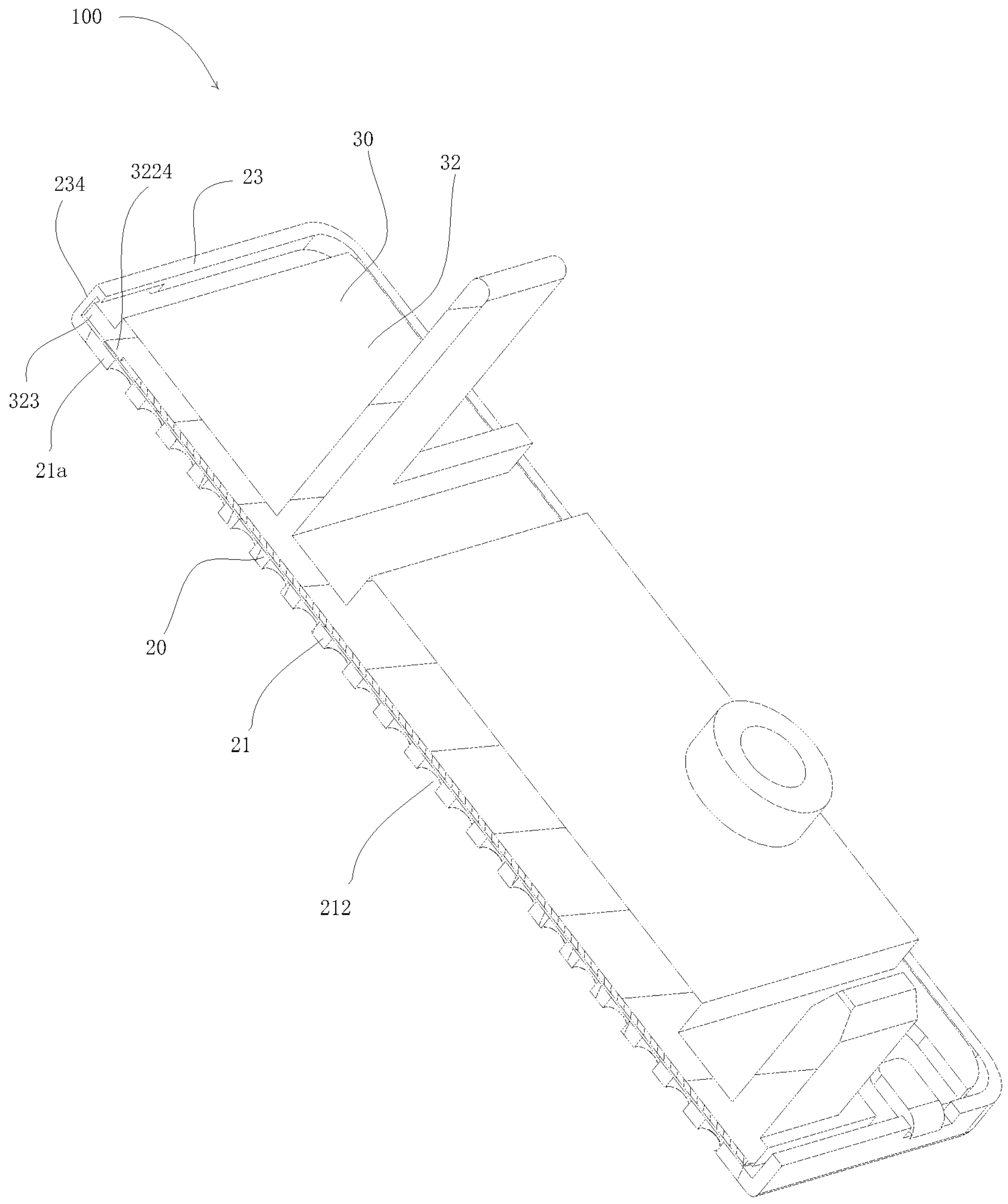
Figure 7:
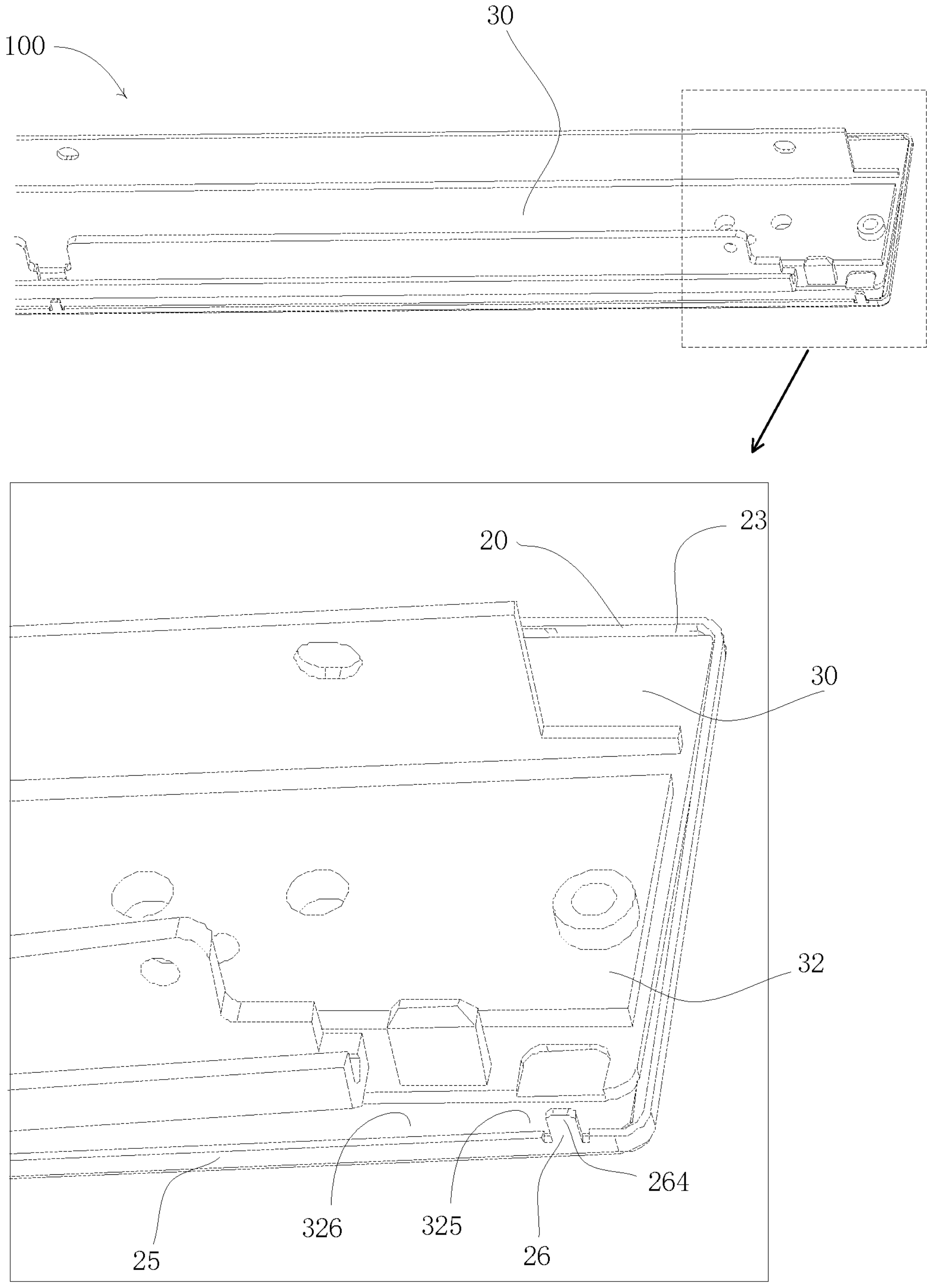
Figure 8:
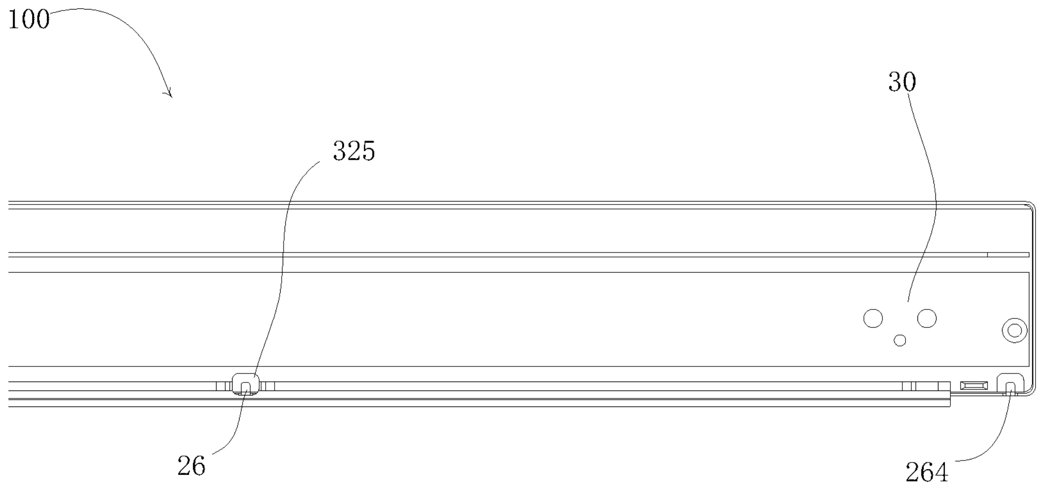
FIG. 8 is a schematic plan view of the speaker mesh and the installation frame in FIG. 1 after being assembled.
Figure 9:
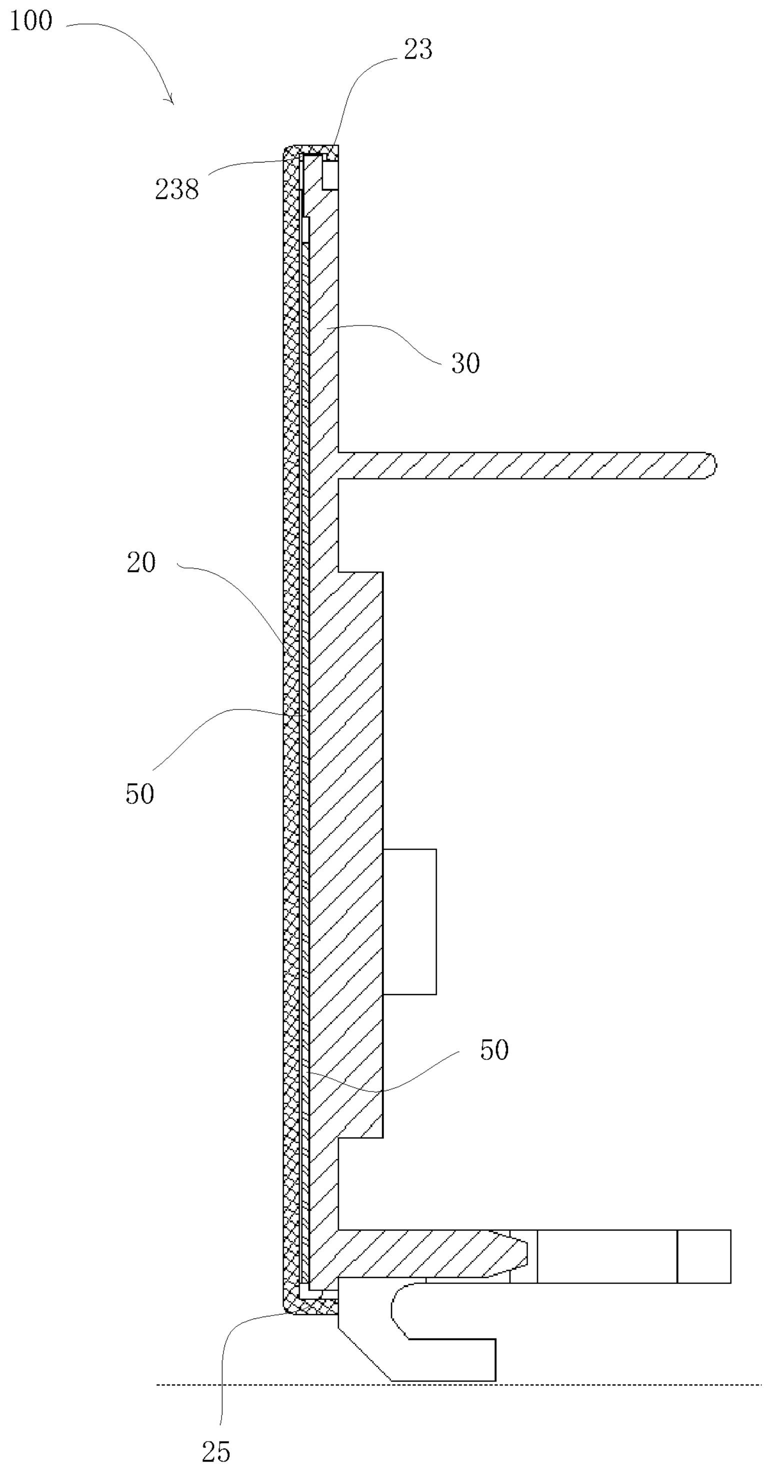
FIG. 9 is a sectional view of an assembled speaker mesh assembly.
Figure 10:
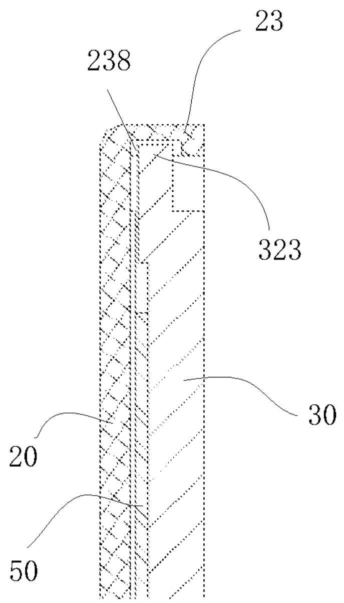
FIG. 10 is a partial enlarged view of FIG. 9.

The present application provides a speaker mesh, a speaker mesh assembly with the speaker mesh, and an electronic device with the speaker mesh assembly. FIG. 1 is a three-dimensional exploded view of one perspective of an embodiment of a speaker mesh assembly consistent with the technical concepts of the present application. FIG. 2 is a three-dimensional view of one perspective of an embodiment of a speaker mesh consistent with the technical concepts of the present application, where the speaker mesh may be applied to the speaker mesh assembly shown in FIG. 1. FIG. 3 is a three-dimensional view of the speaker mesh and the dust cover in FIG. 1 after being assembled. FIG. 4 is a schematic plan view of a double-sided adhesive and an installation frame in FIG. 1 after being assembled. FIG. 5 to FIG. 7 are schematic diagrams of an assembly process of the speaker mesh and the installation frame in FIG. 1. FIG. 8 is a schematic plan view of the speaker mesh and the installation frame in FIG. 1 after being assembled. FIG. 9 is a cross-sectional view of an assembled speaker mesh assembly. FIG. 10 is a partial enlarged view of FIG. 9.

As shown in FIG. 1 and FIG. 2, and with reference to FIG. 3 to FIG. 10 when necessary, the speaker mesh assembly 100 in the embodiments of the present application includes a speaker mesh 20 and an installation frame 30, where the installation frame 30 is configured to install and fix the speaker mesh 20. The speaker mesh 20 in the embodiment includes:

- a mesh body 21 provided with a plurality of speaker holes 212;
- a first sidewall 23 connected to an edge of a first side 21*a* of the mesh body 21, where an inner surface 232 of the first sidewall 23 is provided with a hidden snap-fit portion 238;
- a second sidewall 25 connected to an edge of a second side 21*b* of the mesh body 21, where the second sidewall 25 is provided with a snap member 26.

In some products (for example, an electronic device such as a mobile phone, a notebook, a tablet, a display device, or a television) including the speaker mesh 20, an outer surface 215 and a part of the sidewalls (for example, the first sidewall 23) of the mesh body 21 may be exposed in a relatively conspicuous position, and may be easily seen by a user during use, while another part of the sidewalls (for example, the second sidewall 25) is in a relatively hidden position, and may not be easily seen by the user. By providing the snap-fitting structures (the hidden snap-fit portion 238 on the first sidewall 23 and the snap member 26 on the second sidewall 25) on the two sidewalls (the first sidewall 23 and the second sidewall 25), it can ensure that the speaker mesh 20 can be stably and firmly installed at the corresponding position of the product. In addition, the inner surface of the sidewall (e.g., the first sidewall 23) exposed at the relatively conspicuous position and the sidewall (e.g., the second sidewall 25) at the relatively hidden position cannot be seen by the user during use, and the two snap-fitting structures for realizing stable installation are at the positions which cannot be seen by the user, which can prevent the snap-fitting structures from affecting the aesthetic appearance of the product. Therefore, the speaker mesh 20 can achieve stable installation without spoiling the aesthetic appearance of the product.

Correspondingly, the installation frame 30 for installing the speaker mesh 20 may include a frame body 32, and the frame body 32 is provided with a first matching portion 323 snapped with the hidden snap-fit portion 238 and a second matching portion 325 mated with the snap member 26. After the speaker mesh 20 is placed at a predetermined position, the hidden snap-fit portion 238 and the snap member 26 in the speaker mesh 20 are respectively snapped with the first matching portion 323 and the second matching portion 325 of the installation frame 30, so as to fix and install the speaker mesh 20 and the installation frame 30.

For a relatively large electronic device such as a flat panel television and a display panel, the speaker mesh 20 and the speaker mesh assembly 100 may generally be installed at a lower position of the device. In this use scenario, the first sidewall 23 may be installed on a sky side (the upper side of the speaker mesh 20), which belongs to a relatively conspicuous position; and the second sidewall 25 may be installed on a ground side (the lower side of the speaker mesh 20), which belongs to a relatively hidden position and is not or is not easily seen by the user.

In a specific implementation, the hidden snap-fit portion 238 may be of various types of snap-fitting structures, such as a snap block, a snap groove or a snap hook, as long as it can be hidden on the inner surface of the sidewall where it is located. In this embodiment, the hidden snap-fit portion 238 is a snap groove 238, and the snap groove 238 is formed by recessing the inner surface 232 of the first sidewall 23. Correspondingly, the first matching portion 323 is a protrusion block 323 snapped with the snap groove 238. In the above embodiment, since the snap groove 238 is embedded in the inner surface 232 of the first sidewall 23, which can well prevent the snap-fitting structure (the snap groove 238 and the protrusion block 323) from being exposed.

Further, the snap groove 238 may include a groove bottom 2381 and a plurality of groove sidewalls 2383 connected to the groove bottom 2381, and the groove bottom 2381 and the plurality of groove sidewalls 2383 enclose an accommodating space. During installation, the corresponding structure (protrusion block 323) of the installation frame 30 is inserted into the accommodating space of the snap groove 238, such that positioning and snap-fitting at this position can be realized. The presence of the groove bottom 2381 prevents the snap groove 238 from penetrating the outer surface 234 of the first sidewall 23, thereby preventing the protrusion block 323 installed in place from being exposed through the outer surface 234 of the first sidewall 23. The groove bottom 2381 and the plurality of groove sidewalls 2383 may limit the movement of the protrusion block 323 in a plurality of directions, thereby achieving secure snap-fitting and installation.

In this embodiment, a part of the mesh body 21 is used as one of the plurality of groove sidewalls 2383 of the snap groove 238. Specifically, a part of the inner surface 213 of the mesh body 21 acts as one groove sidewall 2383 of the snap groove 238. In other embodiments, a part of the first sidewall 23 acts as all groove sidewalls 2383 of the snap groove 238. For example, by providing the snap groove 238 in a middle region of the inner surface 232 of the first sidewall 23, a part of the first sidewall 23 acts as all the groove sidewalls 2383 of the snap groove 238.

Further, the inner surface 213 of the mesh body 21 may be provided with a chute 214, and the chute 214 communicates with the snap groove 238. The chute 214 may be formed by recessing the inner surface 213 of the mesh body 21 downward. The T-shaped grooving cutter 80 may be used to manufacture the snap groove 238 and the chute 214, as shown in FIG. 2. The arrangement of the chute 214 can facilitate the manufacturing of the snap groove 238. The arrangement of the chute 214 also facilitates the installation and snap-fitting of the snap groove 238 and the protrusion block 323. During the installation process, the protrusion block 323 may be firstly aligned with the chute 214, and then the protrusion block 323 is pushed to move toward the first sidewall 23 along the chute 214, such that the protrusion block 323 can conveniently enter the snap groove 238 and then be mated and snapped with the snap groove 238. FIG. 2 only schematically shows a specific structure of one snap groove 238. In actual implementation, the number of the snap grooves 238 may be two or more. In order to achieve a better snap-fitting effect, the number of the snap grooves 238 can be set according to a length of the first sidewall 23.

For ease of installation, an inclined guiding surface 23832 may also be provided on at least one groove sidewall 2383 of the snap groove 238. In the embodiments, the two groove sidewalls 2383 on the left and right sides are both provided with guiding surfaces 23832. The guiding surface 23832 can facilitate the protrusion block 323 to enter the snap groove 238. Moreover, providing a guiding slope 3232 at an edge of the protrusion block 323 may also facilitate the protrusion block 323 to enter the snap groove 238.

In the embodiments, the first sidewall 23 and the second sidewall 25 are a pair of sidewalls opposite to each other, such that the hidden snap-fit portion 238 is opposite to the snap member 26. The above arrangement is beneficial to improving the snap-fitting effect thereof.

In this embodiment, the snap member 26 is a bendable elastic member 26. The elastic member 26 has a connecting end 262 and a free end 264, the connecting end 262 is connected to a side of the second sidewall 25 away from the mesh body 21, and the free end 264 can rotate relative to the connecting end 262.

Correspondingly, the frame body 32 has an installation surface 322 for supporting the mesh body 21, a back surface 324 opposite to the installation surface 322 and away from the mesh body 21, and a side surface 326 connecting the installation surface 322 and the back surface 324. After being installed in place, the free end 264 of the snap member 26 abuts against the back surface 324, and the back surface 324 serves as the second matching portion 325 mated with the snap member 26. A recess can be set in the area of the back surface 324 that directly contacts and mates with the snap member 26, as shown in FIG. 8, and the recess can be regarded as the second matching portion 325.

During installation, the snap member 26 may be first in a vertical state, as shown in FIG. 3, in this state, the snap member 26 and the second sidewall 25 are substantially in the same plane, so as to facilitate the installation frame 30 to approach and abut against the inner surface 213 of the mesh body 21. After the installation frame 30 is placed at the predetermined position (at this time, the protrusion block 323 of the installation frame 30 has been mated and snap-fitted with the hidden snap-fit portion 238), as shown in FIG. 7; then, the free end 264 of the snap member 26 can be bent inwards, such that the bent free end 264 is abutted against the back surface 324 of the frame body 32, thereby realizing stable installation and snap-fitting of the installation frame 30 and the speaker mesh 20, and the formed structure is shown in FIG. 8.

In some embodiments, the number of the snap members 26 is two or more. The plurality of snap members 26 can further reinforce the stability of the installation between the installation frame 30 and the speaker mesh 20. In some embodiments, the plurality of snap members 26 may be uniformly arranged; and a large distance may be provided between adjacent snap members 26, so as to reduce the number of the snap members 26 while enhancing the fastening stability.

Further, the speaker mesh 20 may further include:

a third sidewall 27, connected to an edge of a third side 21*c* of the mesh body 21, the third sidewall 27 connecting the first sidewall 23 and the second sidewall 25;

a fourth sidewall 29, connected to an edge of a fourth side 21*d* of the mesh body 21, where the fourth sidewall 29 connects the first sidewall 23 and the second sidewall 25; and where the fourth sidewall 29, the first sidewall 23, the third sidewall 27, and the second sidewall 25 are connected end to end, and jointly form an installation space with the mesh body 21.

During installation, at least a part (or all) of the frame body 32 of the installation frame 30 may be accommodated in the installation space of the speaker mesh 20, and the installation surface 322 of the frame body 32 directly or indirectly abuts against the inner surface 213 of the mesh body 21, and respective side surfaces 326 of the frame body 32 abuts against the inner surfaces of the first sidewall 23, the second sidewall 25, the third sidewall 27 and the fourth sidewall 29. Through the above-mentioned accommodating relationship and abutting relationship, the installation firmness between the installation frame 30 and the speaker mesh 20 can be further enhanced.

In the embodiments, the mesh body 21 is flat, and the plurality of speaker holes 212 are uniformly distributed in the mesh body 21 and penetrate through the inner surface 213 and the outer surface 215 of the mesh body 21. In other embodiments, the mesh body 21 may also be a curved plate according to characteristics of the product or requirements of the user. In an assembled product (for example, an electronic device such as a mobile phone, a notebook, a tablet, a display device, or a television), the outer surface 215 of the mesh body 21 is usually exposed and can be seen by a user.

In the embodiments, the speaker mesh 20 is an integrally connected metal structure. The mesh body 21, the first sidewall 23, the second sidewall 25, the third sidewall 27, and the fourth sidewall 29 are manufactured from the same metal plate.

Further, the speaker mesh assembly 100 may further include a dust cover 40 and a colloid 50, and the dust cover 40 and the colloid 50 are both between the speaker mesh 20 and the installation frame 30. The dust cover 40 may be stuck to the inner surface 213 of the mesh body 21 by glue. The dust cover 40 has smaller pores (relative to the speaker hole 212), which can prevent external dust or other solid particles from entering the interior of the device through the speaker hole 212. In the embodiments, the dust cover 40 has a relatively thin thickness and has a rectangular shape, and the size of the dust cover 40 in the length and width directions is equivalent to or slightly smaller than that of the mesh body 21. During assembly, the dust cover 40 may be first placed in the installation space of the speaker mesh 20, and the dust cover 40 is stuck to the inner surface 213 of the mesh body 21 by glue. The assembled structure of the dust cover 40 and the speaker mesh 20 is shown in FIG. 3.

Figure 11:
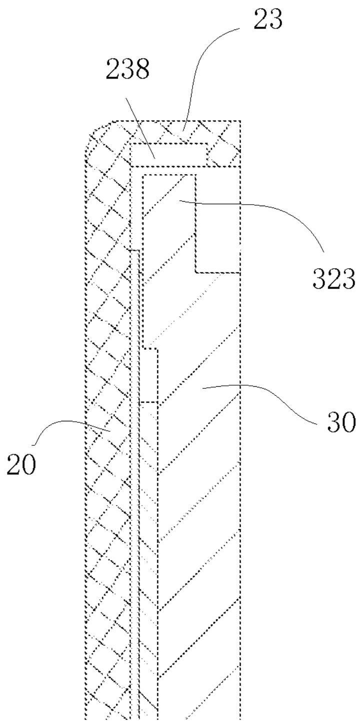
FIG. 11 shows a possible failure of the speaker mesh assembly when there is no colloid.

The colloid 50 may be a double-sided adhesive. As shown in FIG. 4, the colloid 50 may be pre-stuck to the installation surface 322 of the frame body 32 of the installation frame 30. In the embodiments, a step 3224 may be provided at an edge of the installation surface 322, the step 3224 is higher than other areas of the installation surface 322, and the colloid 50) may be stuck to other areas of the installation surface 322 except the step 3224. Then, as shown in FIG. 5 and FIG. 6, the installation frame 30 is close to the speaker mesh 20, and after correct alignment, the installation surface 322 of the frame body 32 is stuck to the inner surfaces 213 of the dust cover 40 and the mesh body 21 through the colloid 50. At this time, the protrusion block 323 on the frame body 32 is snap-fitted in the snap groove 238. Then, as shown in FIG. 7 and FIG. 8, the free end 264 of the snap member 26 is bent inwards, such that the bent free end 264 is abutted against the back surface 324 of the frame body 32, and stable installation and snap-fitting of the installation frame 30 and the speaker mesh 20 can be realized; in the assembled speaker mesh assembly 100, the mating details of the snap groove 238 and the protrusion block 323 can be seen in FIG. 9 and FIG. 10. If there is no colloid 50) or the colloid 50 fails, after long-term use, the installation frame 30 easily moves downward due to gravity and other reasons, such that the protrusion block 323 is separated from the snap groove 238, and the snap-fitting between the speaker mesh 20 and the installation frame 30 fails, as shown in FIG. 11. However, the above-mentioned defects do not occur in a short time and are not easily discovered.

In the embodiments, the installation frame 30 may be a decorative strip commonly used in electronic devices. In addition to the elongated frame body 32 extending mainly along the horizontal plane, the installation frame 30 may further include two fixing plates 35, and the two fixing plates 35 are on the back surface 324 of the frame body 32 and are opposite to each other, so as to fix the installation frame 30 to the electronic device. When applied to a relatively large electronic device such as a flat panel television and a display panel, the two fixing plates 35 are used to fix the rear shell and the back plate of the display panel. An accommodating space 352 is between the two fixing plates 35, and the accommodating space 352 may be configured to accommodate a speaker. Through holes (not shown) may be provided in the frame body 32 to facilitate outward transmission of the sound of the speaker.

To clarify, in the embodiments shown in the drawings, the sizes of the speaker mesh 20, the installation frame 30 and the like in the length direction are extremely large, which are far greater than the sizes in the width and thickness directions. For convenience, only a portion of the length of the speaker mesh 20, the installation frame 30 and the like in the length direction is shown in the drawings.

In summary, in the embodiments of the present application, providing the snap-fitting structures (the hidden snap-fit portion 238 on the first sidewall 23 and the snap member 26 on the second sidewall 25) on the two sidewalls (the first sidewall 23 and the second sidewall 25) ensures that the speaker mesh 20 can be stably and firmly installed at the corresponding position of the product. In addition, the inner surface of the sidewall (e.g., the first sidewall 23) exposed at the relatively conspicuous position and the sidewall (e.g., the second sidewall 25) at the relatively hidden position cannot be seen by the user during use, and the two snap-fitting structures for realizing stable installation are disposed at the positions which cannot be seen by the user, which can prevent the snap-fitting structures from affecting the aesthetic appearance of the product. Therefore, the speaker mesh 20 can achieve stable installation without spoiling the aesthetic appearance of the product.

The above description describes embodiments of the present application and is not intended to limit the present application, and any modifications, equivalent substitutions, improvements and the like made within the spirit and principle of the present application shall fall within the protection scope of the present application.

The invention claimed is:

1. A speaker mesh, comprising:

a mesh body provided with a plurality of speaker holes;

a first sidewall connected to an edge of a first side of the mesh body, wherein an inner surface of the first sidewall is provided with a hidden snap-fit portion;

a second sidewall connected to an edge of a second side of the mesh body, wherein the second sidewall is provided with a snap member;

wherein the hidden snap-fit portion comprises a snap groove, and the snap groove is formed by recessing an inner surface of the first sidewall;

wherein the snap groove comprises a groove bottom and a plurality of groove sidewalls connected to the groove bottom, and the groove bottom and the plurality of groove sidewalls enclose an accommodating space; and wherein a part of the mesh body is used as one of the plurality of groove sidewalls of the snap groove; and the inner surface of the mesh body is provided with a chute, and the chute communicates with the snap groove.

2. The speaker mesh according to claim 1, wherein at least one of the plurality of groove sidewalls is provided with an inclined guiding surface.

3. The speaker mesh according to claim 1, further comprising:

a third sidewall connected to an edge of a third side of the mesh body, wherein the third sidewall connects the first sidewall and the second sidewall; and a fourth sidewall connected to an edge of a fourth side of the mesh body, wherein the fourth sidewall connects the first sidewall and the second sidewall, wherein the fourth sidewall, the first sidewall, the third sidewall and the second sidewall are connected end to end, and jointly form an installation space with the mesh body.

4. The speaker mesh according to claim 1, wherein the mesh body has a flat shape, and the plurality of speaker holes are uniformly distributed in the mesh body and penetrate through an inner surface and an outer surface of the mesh body; and the speaker mesh is an integrally connected metal structure.

5. An electronic device, comprising the speaker mesh according to claim 1.

6. A speaker mesh, comprising:

a mesh body provided with a plurality of speaker holes;

a first sidewall connected to an edge of a first side of the mesh body, wherein an inner surface of the first sidewall is provided with a hidden snap-fit portion; and a second sidewall connected to an edge of a second side of the mesh body, wherein the second sidewall is provided with a snap member;

wherein the first sidewall and the second sidewall are opposite to each other, the snap member is a bendable elastic member, the snap member has a connecting end and a free end, the connecting end is connected to a side of the second sidewall away from the mesh body, and the free end is bendable relative to the connecting end.

7. The speaker mesh according to claim 6, wherein there are two or more snap members.

8. A speaker mesh assembly, comprising:

a speaker mesh comprising a mesh body, a first sidewall and a second sidewall, wherein the mesh body is provided with a plurality of speaker holes, the first sidewall is connected to an edge of a first side of the mesh body, an inner surface of the first sidewall is provided with a hidden snap-fit portion, the second sidewall is connected to an edge of a second side of the mesh body, and the second sidewall is provided with a snap member; and an installation frame comprising a frame body, wherein the frame body is provided with a first matching portion snapped with the hidden snap-fit portion and a second matching portion mated with the snap member;

wherein the hidden snap-fit portion comprises a snap groove, and the snap groove is formed by recessing an inner surface of the first sidewall; and the first matching portion includes a protrusion block snapped with the snap groove.

9. The speaker mesh assembly according to claim 8, wherein the snap groove comprises a groove bottom and a plurality of groove sidewalls connected to the groove bottom, and the groove bottom and the plurality of groove sidewalls enclose an accommodating space for accommodating the protrusion block.

10. The speaker mesh assembly of claim 9, wherein a part of the mesh body is used as one of the plurality of groove sidewalls of the snap groove; and the inner surface of the mesh body is provided with a chute, and the chute communicates with the snap groove.

11. The speaker mesh assembly according to claim 9, wherein at least one of the plurality of groove sidewalls is provided with an inclined guiding surface;

and/or, a guiding slope is provided at an edge of the protrusion block.

12. The speaker mesh assembly according to claim 8, wherein the first sidewall and the second sidewall are opposite to each other, the snap member is a bendable elastic member, the snap member has a connecting end and a free end, the connecting end is connected to a side of the second sidewall away from the mesh body, and the free end is bendable relative to the connecting end; and the frame body is provided with an installation surface for supporting the mesh body, a back surface opposite to the installation surface and away from the mesh body, and a side surface for connecting the installation surface and the back surface, the free end of the snap member is abutted against the back surface, and the back surface serves as the second matching portion mated with the snap member.

13. The speaker mesh assembly according to claim 8, wherein the speaker mesh assembly further comprises a dust cover and/or a colloid arranged between the mesh body and the frame body.

14. An electronic device, comprising the speaker mesh assembly according to claim 8.

* * * * *